UNITED STATES PATENT OFFICE.

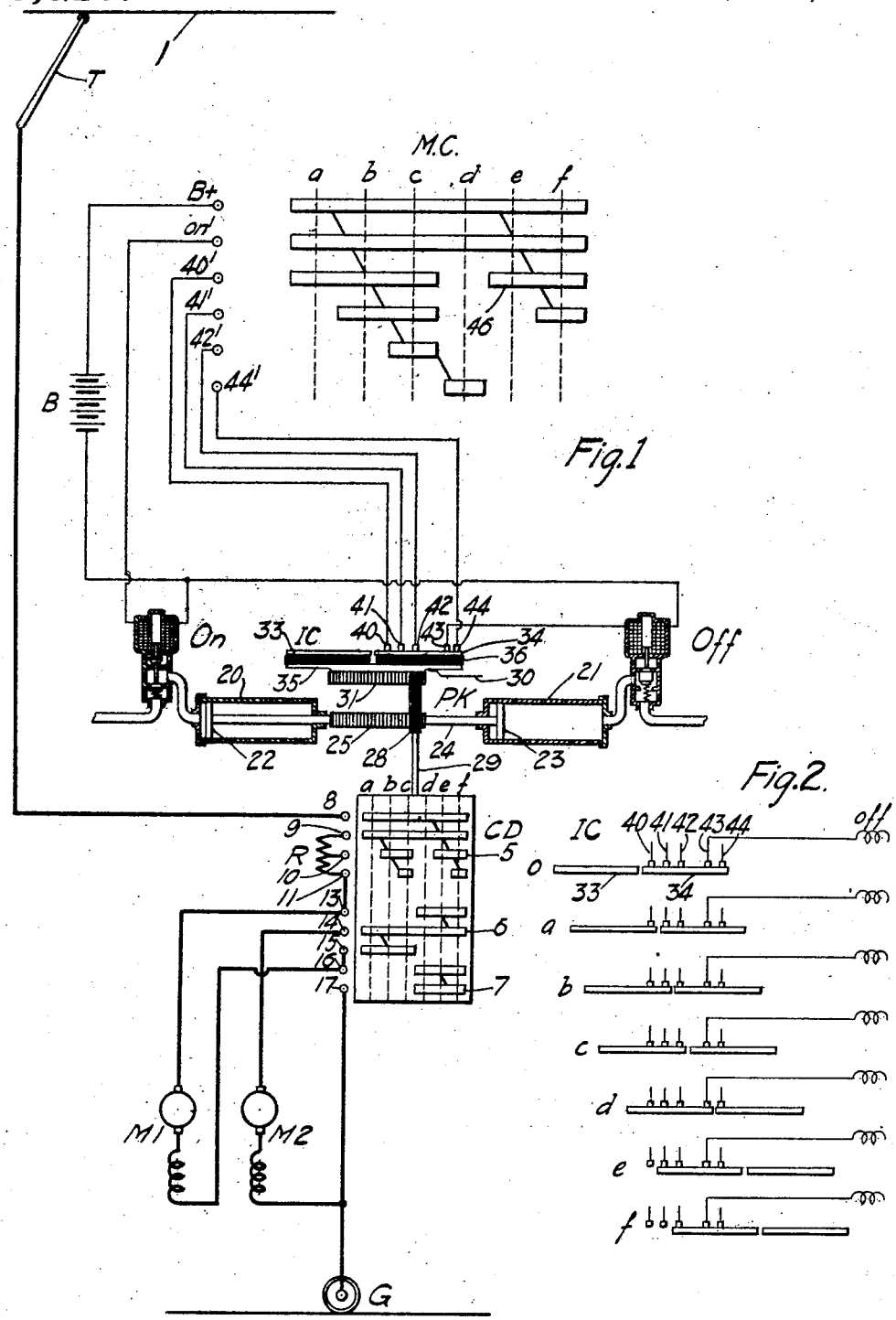

PAUL L. MARDIS, OF ALTOONA, PENNSYLVANIA, ASSIGNOR TO WESTINGHOUSE ELECTRIC AND MANUFACTURING COMPANY, A CORPORATION OF PENNSYLVANIA.

CONTROL APPARATUS AND SYSTEM.

1,295,915.     Specification of Letters Patent.     Patented Mar. 4, 1919.

Application filed May 3, 1915. Serial No. 25,497.

*To all whom it may concern:*

Be it known that I, PAUL L. MARDIS, a citizen of the United States, and a resident of Altoona, in the county of Blair and State of Pennsylvania, have invented a new and useful Improvement in Control Apparatus and Systems, of which the following is a specification.

My invention relates to control apparatus and control systems for fluid-actuated devices, and it has special reference to systems of remote control for dynamo-electric machines.

One of the objects of my invention is to provide improved and simplified control apparatus and a control system for governing the operation of a fluid-actuated drum controller for the purpose of controlling the operation of a plurality of railway motors.

More specifically stated, it is an object of my invention to provide a novel, compact and reliable form of interlocking device that shall, in conjunction with a suitable master controller, be adapted to govern the operation of an electrically controlled fluid-actuated operating device by means of which a drum controller is advanced step-by-step through its several positions.

In a co-pending application, Serial No. 724,063, filed October 5, 1912, by N. W. Storer and A. J. Hall, and assigned to the Westinghouse Electric & Manufacturing Company, a control system of this general character is disclosed, which embodies an interlock control device of the rotatable-drum type for the purpose of governing the operation of the electro-pneumatic operating mechanism. When an interlock control device of this form is provided with a plurality of contact fingers, a considerable amount of vertical space is taken up thereby, which either unnecessarily increases the longitudinal dimensions of the controller, as a whole, or makes it necessary to crowd the parts of the apparatus in an undesirable manner, and, likewise, increases the cost of manufacture and the weight of the apparatus.

According to my present invention, I provide a simple and inexpensive reciprocating interlock device which may be compactly assembled and is particularly economical of longitudinal space and which, moreover, accomplishes, with reliability and effectiveness, the functions for which former types of rotatable interlock control drums are adapted.

In the accompanying drawing, Figure 1 is a diagrammatic view of a system of control and control apparatus embodying my invention, and Fig. 2 is a diagrammatic view of the interlock control device, showing the circuit connections thereof in their various positions.

Referring to the drawing, the apparatus shown comprises a supply circuit 1—G, a master controller MC, a plurality of motors $M^1$ and $M^2$, a main control drum CD and accelerating resistor R, a pneumatically actuated operating device PK and an interlock control device IC.

The control drum CD is of the usual drum type and comprises a plurality of movable conducting segments 5, 6 and 7, that are adapted to coöperatively engage a plurality of stationary contact terminals 8, 9, 10, 11, 13, 14, 15, 16 and 17 along the position-indicating lines $a$, $b$, $c$, $d$, $e$ and $f$ for the purpose of arranging the circuit connections of the resistor R and the motors $M^1$ and $M^2$, which are adapted to receive energy from the supply circuit which conveniently comprises the trolley conductor 1 and the ground G.

The fluid-actuated operating device PK is of a well-known type and preferably comprises a device similar to that set forth in the co-pending application, hereinbefore referred to, and embodies a plurality of operating cylinders 20 and 21 that respectively contain movable pistons 22 and 23 that are mechanically associated by a rod 24 that is provided with a rack 25. The outer end of the cylinder 20 is suitably connected to an electrically controlled magnet valve marked "On" for the purpose of governing the admission and release of air or other operating fluid to and from the cylinder 20, while the cylinder 21 is similarly provided with an electrically controlled magnet valve marked "Off" for performing similar functions.

The valves referred to, differ in specific construction, the "on" magnet valve being normally adapted, when deënergized, to cut off the supply of operating fluid to the associated cylinder and to establish a communication between the atmosphere and the cylinder, and, when energized, to admit operating fluid to the cylinder. The "off" magnet valve, on the contrary, when deenergized, admits operating fluid to its associated cylinder and, when energized, cuts off the supply of fluid and exhausts the fluid from the cylinder.

In order to actuate the control drum CD, a pinion 28 is provided for operative engagement with the rack 25. Said pinion 28 is connected by means of a shaft 29 to the control drum.

The interlock controller IC comprises a supporting member or carrier 30 that is provided with a rack 31 for engagement with the pinion 28 and is also provided with a pair of alined contact strips or segments 33 and 34 that are arranged in end-to-end relation and are adapted for reciprocating rectilinear movements in accordance with the operation of the actuating device PK. The conducting segments 33 and 34 are conveniently mounted upon blocks 35 and 36 of insulating material. A plurality of stationary contact terminals or fingers 40, 41, 42, 43, and 44 are disposed in a row in the line of movement of the conducting segments 33 and 34 and are adapted for coöperative electrical engagement therewith as said segments are actuated through their different positions.

Obviously, my invention is not restricted to the specific form of interlock control device IC set forth, as other types of similar devices may be equally well employed so long as the stationary contact fingers are disposed in a row and displaced, the one from the other, with reference to the line of movement of the movable contact member.

The master controller MC comprises a movable conducting segment 46 and a plurality of stationary contact terminals B+, on', 40', 41', 42' and 44' that are adapted for engagement therewith upon the position-indicating lines $a$, $b$, $c$, $d$, $e$ and $f$, said contact terminals being electrically connected to devices bearing corresponding reference characters. By suitable manipulation of the master controller MC, in conjunction with the operation of the interlock controller IC, a battery B is adapted to energize the "off" and "on" magnet valves of the operating device PK in such manner as to effect the actuation of the control drum CD through its several steps or positions.

Assuming the various pieces of apparatus and circuit connections to be as shown in the drawing, the operation of the system is as follows: The master controller MC is first moved to its position $a$, thereby completing a circuit from the battery B which includes stationary contact terminal B+ and movable conducting segment 46, where the circuit divides, one branch including contact terminal on' and the energizing coil of the "on" magnet valve to the battery, and the other branch including contact terminal 40', contact terminal 40, conducting segment 34, contact terminal 43 and the energizing coil of the "off" magnet valve to the battery. The magnet valves "On" and "Off", being thus energized, are concurrently actuated, the "on" magnet valve being adapted to admit operating fluid to the cylinder 20, while the "off" magnet valve is adapted to permit the exhaust of fluid from the cylinder 21 and to cut off the supply of operating fluid. Thus, unbalanced pressures are established which act upon the associated pistons 22 and 23 in such manner as to effect the movement thereof in a direction to the right, as will be understood.

In so doing, the controller drum CD and interlock controller IC are actuated through the agency of the pinion 28 and other associated mechanical elements. The drum CD is moved to its position $a$, in which the contact terminal 40 of the interlock controller IC becomes disengaged from the conducting segment 34. Thus, the "off" magnet valve is deënergized, whereby said valve returns to its initial position and effects balanced pressures in the cylinders 20 and 21. The control drum CD and interlock controller IC are, therefore, brought to rest. The position of the interlock controller IC is indicated in step $a$ of Fig. 2.

As soon as the control drum CD is moved into its position $a$, a circuit from the trolley conductor 1 through the motors $M^1$ and $M^2$ is established, which includes trolley T, contact terminal 8, conducting segment 5, contact terminal 9, accelerating resistor R, contact terminals 11 and 13, motor $M^1$, contact terminals 16 and 15, conducting segment 6, contact terminal 14 and motor $M^2$ to the ground G. The motors, therefore, are connected in series-circuit relation and are started into operation.

In order to increase the speed of the motors $M^1$ and $M^2$, the master controller MC may be moved to position $b$, in which another circuit is completed from conducting segment 46 which includes conducting terminal 41', contact terminal 41, conducting segment 34, contact terminal 43 and energizing coil of the "off" magnet valve to the battery. Thus, the "off" magnet valve is again energized, and unbalanced pressure conditions are established, which results in the actuation of the main controller CD and interlock controller IC by means of the actuating device PK, in the manner hereinbefore set forth. This movement takes place until the controller CD occupies its position $b$, in which contact terminal 41 is disengaged from the conducting segment 34, as shown in step b of Fig. 2. Thus, the "off" magnet valve is again deënergized, and further movements of the apparatus are arrested.

In position b of the control drum CD, the upper section of the resistor R is excluded from the circuit of the motors $M^1$ and $M^2$, and the speed thereof is, therefore increased.

The master controller may then be moved into position c, in which a circuit is established from conducting segment 46 which includes contact terminal 42' contact terminal 42, conducting segment 34, contact terminal 43 and the energizing coil of the "off" magnet valve to the battery. Upon the reënergization of the magnet valve "Off", the operating device PK again becomes active and advances the controller drum CD and interlock controller IC into position c where the movement is arrested by reason of the disengagement of contact terminal 42 from conducting segment 34, as shown in step c of Fig. 2.

In position c of the control drum CD, the second section of the accelerating resistor R is excluded from the motor circuit, and the motors $M^1$ and $M^2$, therefore, are permitted to increase their speed further.

As the master controller MC is then moved to position d, the contact terminals 40', 41' and 42' become disengaged from the conducting segment 46, immediately after which, the contact terminal 44' becomes engaged therewith and a circuit is established which includes contact terminal 44', contact terminal 44, conducting segment 34, contact terminal 43 and energizing coil of the "off" magnet valve to the battery B. Thereupon, the magnet valve "Off" is energized, and the resulting unbalanced pressure conditions within the cylinders 20 and 21, effects the actuation of the controller CD and interlock device IC until the control drum CD occupies its position d in which the contact terminal 43 becomes disengaged from the conducting segment 34, as shown in step d of Fig. 2.

In position d of the main control drum DC, the motor circuit includes trolley T, contact terminals 8, conducting segment 5, contact terminal 10, resistor R and contact terminals 11 and 13, where the circuit divides, one branch traversing the motor $M^1$ contact terminal 16, conducting segment 7, and contact terminal 17 to the ground G, while the other branch includes conducting segment 6, contact terminal 14, and motor $M^2$ to the ground G. The motors $M^1$ and $M^2$ are, therefore, connected in parallel relation and in series with the accelerating resistance, and, therefore, the motor speed is increased.

In moving from position d to position e, the conducting segment 46 becomes disengaged from contact terminal 44', after which the contact terminal 40' is brought into engagement therewith to establish a circuit which also includes contact terminal 40, conducting segment 33, contact terminal 43, and the energizing coil of the "off" magnet valve to the battery. Thereupon, the "off" magnet valve is energized and effects the exhaust of fluid from cylinder 21, thereby producing unbalanced pressure conditions which serve to advance the operating device PK and associated control drums CD and IC to their positions e. When the interlock controller IC reaches position e, its contact terminal 40 becomes disengaged from the conducting segment 33, as shown in step e of Fig. 2, whereby the "off" magnet valve is deënergized, and balanced pressure conditions are restored.

The driving motors $M^1$ and $M^2$ are, therefore, further accelerated, by reason of the fact that the upper section of the accelerating resistor R is excluded from the circuit.

In the last position of the master controller, position f, the contact terminal 41' is energized, and a circuit is completed which also includes contact terminal 41, conducting segment 33, contact terminal 43 and energizing coil of the "off" magnet valve. As the "off" magnet valve is actuated to release operating fluid from cylinder 21, the main control drum CD and interlock controller IC are advanced into their last position f, in which position further movement thereof is arrested by the disengagement of the contact terminal 41 from the conducting segment 33 of the interlock controller IC, the circuit connections being as indicated in step f of Fig. 2.

The main control drum CD, in moving into its position f, excludes the last section of the resistor R and thereby establishes full-speed running connections for the parallel-related motors $M^1$ and $M^2$.

Although I have shown and described my invention as embodying apparatus and circuit connections of more or less specific character, many modifications therein may be effected without departing from the spirit and scope of my invention and such modifications are intended to be covered by the appended claims.

I claim as my invention:

1. The combination with a contact member, fluid-operated means for moving said contact member, a plurality of electrically-controlled magnet-valves for governing the operation of said fluid means, and a controller for selectively governing the operation of said magnet-valves, of a plurality of independent contact fingers adapted for sliding engagement with said member and displaced from each other in the line of movement of said member.

2. The combination with a plurality of contact members, a fluid-operated device for giving said members a rectilinear movement, two magnet-valves for controlling the operation of said device, and means for governing the operation of said valves to effect a step by step movement of said contact members, of a plurality of stationary contact fingers adapted to engage said members and disposed in a row in the line of movement of said members.

3. In combination, a contact member adapted for rectilinear movement, a fluid-operated device for moving said member, a plurality of electrically controlled magnet-valves for governing the operation of said device, and means comprising a plurality of contact fingers disposed in a row in the line of movement of said contact member and coöperating therewith for selectively operating said magnet-valves.

4. The combination with a device to be actuated, an actuator therefor and a plurality of electrically controlled magnet valves for governing the operation of said actuator, of an interlocking device associated with said member to be actuated and adapted to govern the energization of only one of said magnet valves and comprising a plurality of movable contact members disposed in end-to-end relation, and a plurality of coöperating stationary contact members disposed in the line of movement of said contact members.

5. The combination with a member to be actuated, an electrically controlled pneumatically operated device for operating said member, and a master controller for governing the operation of said electrically controlled device, of interlocking means associated with said member to be actuated for coöperating with said master controller for governing the operation of said electrically controlled actuating device and comprising a pair of alined contact segments adapted for rectilinear movement and a plurality of stationary contact fingers disposed in alinement with said contact segments and adapted for engagement therewith.

6. The combination with an electric motor, a rotatable control drum having a plurality of positions for governing the operation thereof, an electrically controlled pneumatically actuated device for moving said control drum through its positions, of a reciprocating interlock control device adapted to be actuated by said operating device and comprising a plurality of movable alined contact members and an alined row of contact fingers normally adapted to engage one of said contact members for the purpose of governing the operation of said electrically controlled pneumatic device and a master controller associated with certain of the fingers of said interlock control device for coöperating therewith to determine the operation of said rotatable control drum.

7. The combination with an electrically controlled fluid-actuated device, a movable rack associated therewith and an auxiliary interlock device comprising a movable contact member and a plurality of stationary contact fingers in alinement therewith, of a rack associated with said auxiliary interlock device and a pinion coöperatively engaging both of said racks, whereby rectilinear movements are imparted to said movable contact member in accordance with the movements of said fluid-actuated device.

8. The combination with an actuating device adapted for rectilinear movements, and a plurality of alined movable contact members mechanically associated therewith and adapted for rectilinear movements, of a plurality of stationary contact fingers disposed in a row parallel to the line of movement of said contact members and adapted to have sliding engagement with said contact members.

9. The combination with a device adapted to be rotated, a contact member adapted to be given a rectilinear movement, and fluid-operated means for simultaneously operating said device and said contact member, of a controller and means governed by said controller and by said contact member for governing the operation of said fluid-operated means.

10. The combination with a contact drum, contact members and means for giving said contact drum a movement of rotation and for giving said contract members a movement of translation, of a plurality of stationary contact fingers adapted to engage said contact members and disposed in a row in the line of movement of said members.

11. The combination with a contact drum, contact members and pneumatic means for simultaneously giving said contact drum a movement of rotation and said contact members a movement of translation, of a plurality of independent contact fingers adapted for engagement with said contact members and displaced from each other in the line of movement of said contact members.

12. The combination with a contact drum, a plurality of contact members, pneumatic means for simultaneously giving said drum a movement of rotation and said contact members a movement of translation, and magnet-valves for controlling said pneumatic means, of a plurality of contact fingers adapted to engage said contact members and disposed in a row in the line of movement of said members.

13. The combination with a contact drum, two contact members, a pneumatic device for simultaneously giving said contact drum a movement of rotation and said contact members a movement of translation, and two magnet-valves for controlling said pneumatic device, of a controller and means comprising said controller and said contact members for governing the operation of said magnet-valves.

In testimony whereof, I have hereunto subscribed my name this 27" day of April, 1915.

PAUL L. MARDIS.

Witnesses:
ALEX. WEIR,
PERRY H. WEDGE.